May 17, 1932. R. A. FARNHAM 1,858,732
MECHANISM FOR REMOVING ARTICLES FROM THEIR CARRYING TRAYS
Filed May 1, 1929 4 Sheets-Sheet 1
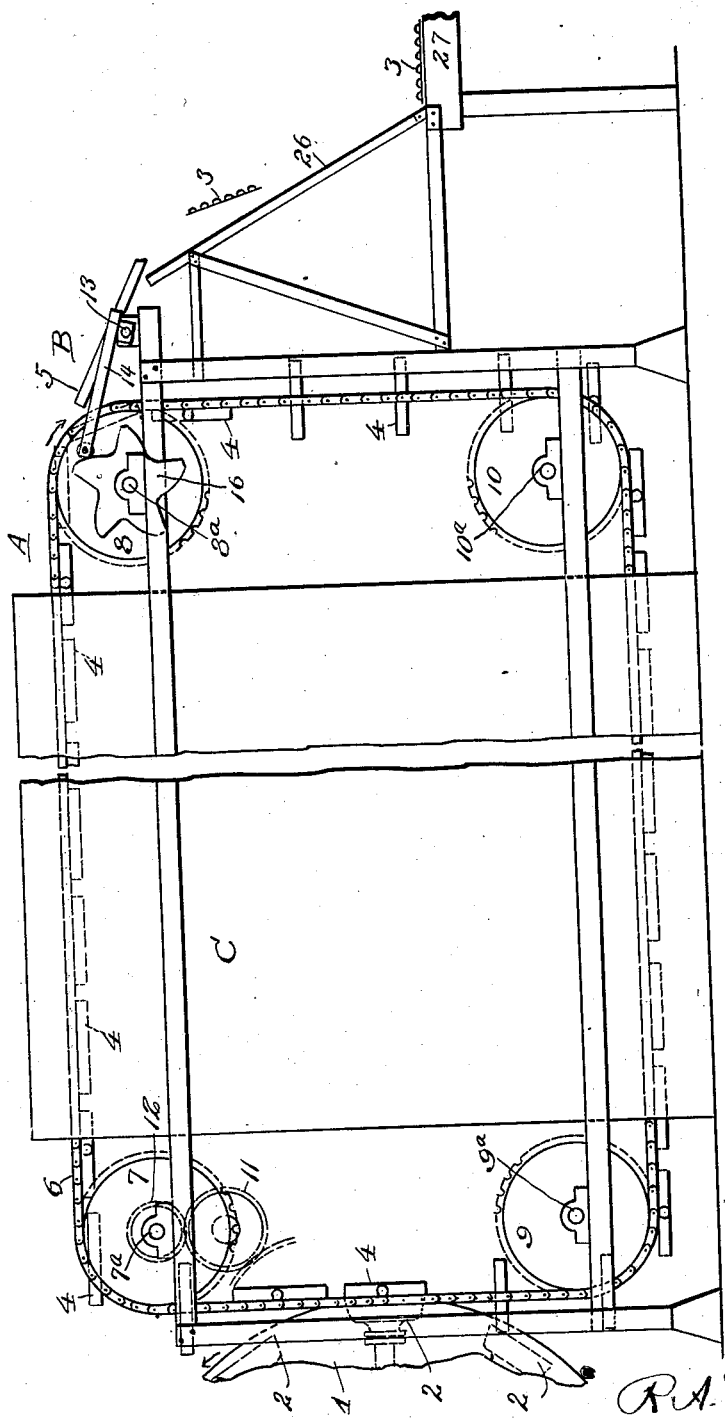
INVENTOR.
R. A. Farnham
BY
Morrison, Kennedy Campbell
ATTORNEYS May 17, 1932. R. A. FARNHAM 1,858,732
MECHANISM FOR REMOVING ARTICLES FROM THEIR CARRYING TRAYS
Filed May 1, 1929 4 Sheets-Sheet 2
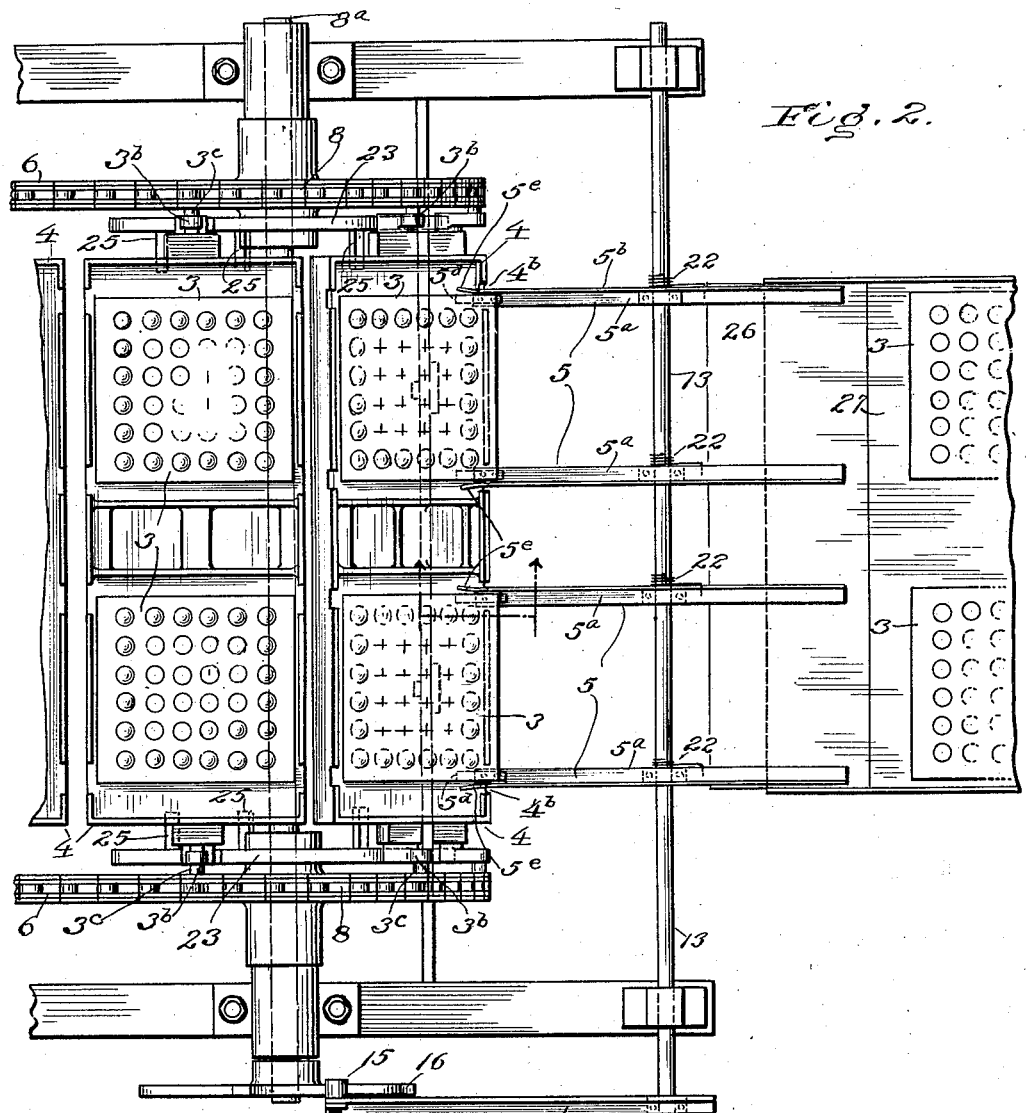
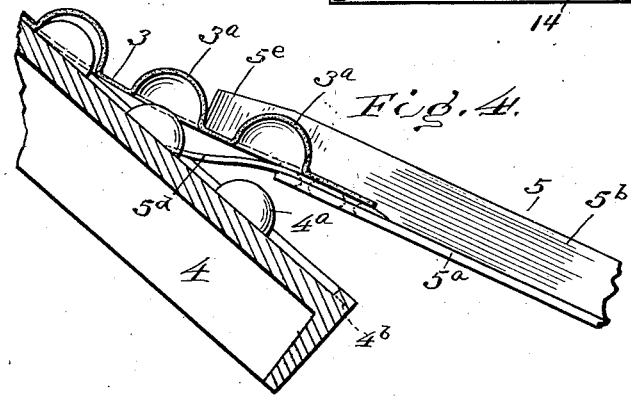
INVENTOR.
R. A. Farnham
BY Morrison, Kennedy Campbell
ATTORNEYS.

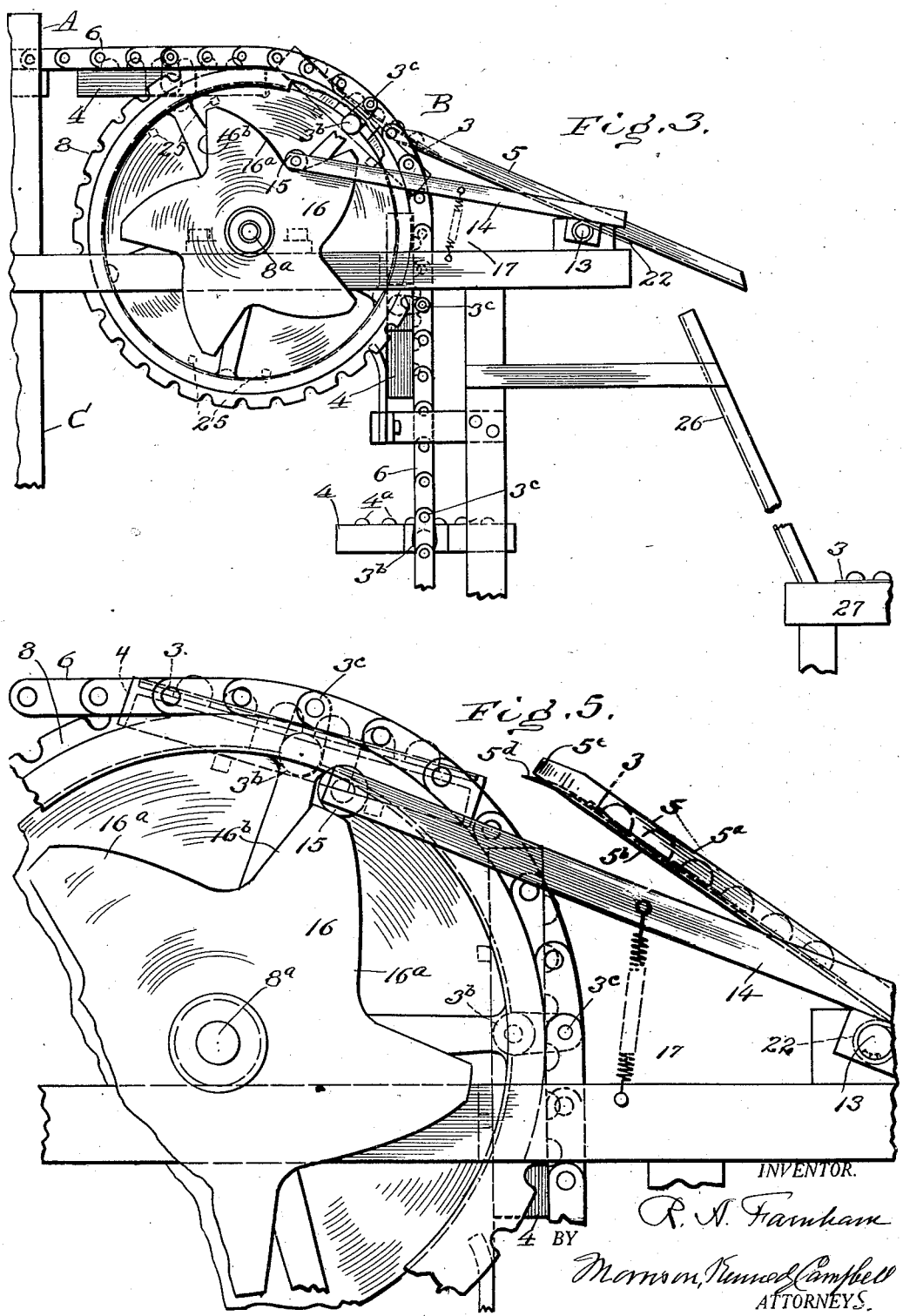

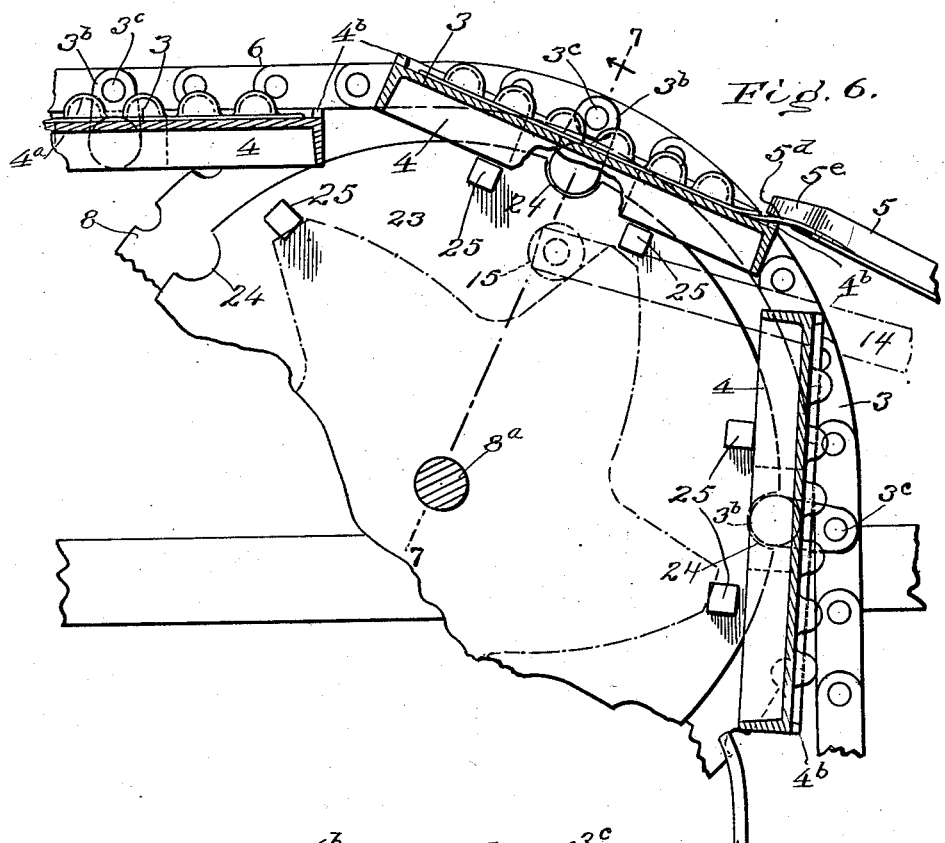
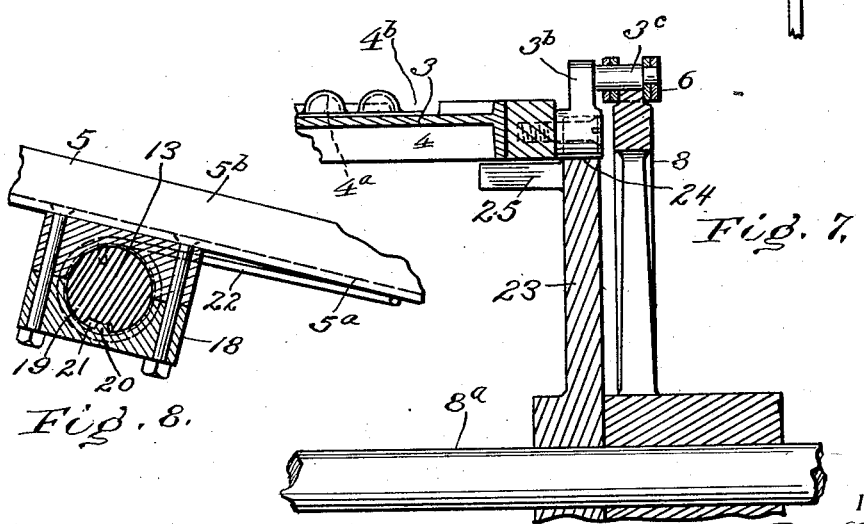

Patented May 17, 1932

1,858,732

UNITED STATES PATENT OFFICE

RALPH A. FARNHAM, OF HERKIMER, NEW YORK, ASSIGNOR, BY MESNE ASSIGNMENTS, TO HOLED-TITE PACKING CORPORATION, OF NEW YORK, N. Y., A CORPORATION OF NEW YORK

MECHANISM FOR REMOVING ARTICLES FROM THEIR CARRYING TRAYS

Application filed May 1, 1929. Serial No. 359,510.

This invention relates to machines for forming fillers for use in packing merchandise, which fillers are usually in the form of boards or sheets provided with cells or cavities to embrace the articles to be packed, such as eggs, bottles, and the like. These boards or sheets commonly known as "cell boards", are usually molded from pulp in a machine equipped with flat molds, which in the operation of the machine are immersed in a vat of pulp, whereby the molds will each withdraw from the vat, a quantity of pulp to form the cell board, from which the water is removed and the molded forms or articles discharged one at a time onto carrying trays, which are run through an oven or drying chamber to remove the moisture from the molded articles and dry the same, and the dried articles are finally removed from the trays in succession, and then carried away for use.

The present invention is concerned with the removal or stripping of the molded forms or articles from the carrying trays, and the invention consists of an improved form of mechanism, which in the travel of the trays after leaving the drying oven, will act automatically to dislodge or remove the molded articles in succession from the traveling trays, whereby the articles will be stripped from the trays expeditiously and with certainty, without danger of injuring or marring the articles, and without the intervention of human agencies.

The improved mechanism will be described in detail in the specification to follow, and the novel features thereof will be pointed out in the appended claims.

In the accompanying drawings:—

Figure 1 is a diagrammatic view, showing such portions of a molding machine as will be necessary for an understanding of the invention, and showing in conjunction therewith, an endless chain of trays for receiving the molded articles from the machine and carrying them through the drying oven, and showing also the improved mechanism for removing the articles from the trays;

Fig. 2 is a plan view of the delivery end of the chain of trays, and the article removing mechanism associated therewith;

Fig. 3 is a side elevation of the same;

Fig. 4 is a fragmentary vertical section on an enlarged scale, showing the first stage of the operation of dislodging the molded article from the carrying tray;

Fig. 5 is a view similar to Fig. 3, but on an enlarged scale, showing the parts in a different position from that shown in Fig. 3;

Fig. 6 is a view similar to Fig. 5, but with the parts in still another position;

Fig. 7 is a fragmentary vertical section elevation on the line 7—7 of Fig. 6.

Fig. 8 is a sectional elevation on an enlarged scale, showing the specific form of connection between the article lifting members and their operating shaft.

Referring to the drawings:—

In Fig. 1, there is shown a transfer mold wheel 1, provided on its periphery with a number of molds 2, to which the molded articles or cell boards 3 are transferred from the forming mold wheel not shown, and from the transfer mold wheel, the molded articles are delivered to carrying trays 4, arranged in an endless traveling series, which carry the molded articles from the transfer wheel through a drying oven or chamber C, through which the upper stretch of the endless series of trays passes. At the point where the trays emerge from the drying oven, as indicated at A, the mechanism of the present invention indicated by the letter B, is located, and said mechanism cooperates with the trays in such manner that, as the trays pass in succession along their path or circuit, a pair of article lifting members 5 of said mechanism is presented in the path of the molded articles on the trays and beneath the forward edges of said articles, and by the combined movements of the trays and the lifting members, the articles are dislodged from the trays by a stripping action, and are directed away from the trays to a point where they may be collected and removed from the machine.

The carrying trays 4, as best shown in Figs. 2, 6, and 7, are of flat rectangular form, and are provided with protuberant portions 4ª, over which fit the cavities or cells 3ª of the molded articles or cell boards 3. At its opposite ends, each tray has fixed to it, arms 3b, having on their outer ends, horizontal outwardly extending studs 3c, situated in a plane above the upper surface of the tray, which studs are journalled in the links of two endless carrier chains 6, 6. These chains pass around four pairs of guide or sprocket wheels, upper front and rear pairs 7 and 8, and lower front and rear pairs 9 and 10, which wheels are carried respectively by horizontal shafts 7a, 8a, 9a, and 10a, mounted in bearings in a suitable supporting framework. The chain of trays may be driven in any suitable manner to cause the upper stretch of the chain to travel through the oven chamber. In the present instance, the driving of the chains is effected by means of a driving pinion 11, receiving its power from a suitable source and meshing with a pinion 12 fixed to the shaft 7a, whereby rotary motion will be imparted to the sprocket wheels 7, and thence to the chains.

As shown in Fig. 2, each tray is of a width to accommodate two cell boards side by side, and the tray is formed with a vertical marginal flange surrounding the same at its sides and ends. At the front and rear, these flanges are cut out to form notches 4b, which extend to the bottom of the tray, and are located in line respectively with the outer edges of the cell boards carried by the tray, there being in each flange, four notches at the front and similarly four notches at the rear, the purpose of which will presently appear.

The lifting members 5, before alluded to as being presented beneath the molded articles on the trays to lift and remove the same, are arranged in two pairs as shown in Fig. 2, so that a pair of said members may be presented to each of the two articles on the tray, and each of the members of a pair consists of a bar, having a flat bottom portion 5a, and a vertical edge flange 5b. These bars are mounted between their ends in the manner presently to be described, in suitable spaced relations to enter the respective notches 4b, on a horizontal transverse rock shaft 13 mounted in bearings on the framework, and they are arranged on the shaft with the horizontal portions of the bars of a pair facing each other, and with the vertical flanges at the outside, so that the molded articles dislodged from the tray, will be supported on the horizontal portions of the bars, and will be guided between the vertical flanges as said articles leave the tray. The ends of the horizontal portions of the bars have attached to them, flexible tongues 5d, which are sharpened at their terminal portions to enable them to enter with certainty between the bottoms of the trays and the undersides of the cell boards thereon; and the ends of the vertical flanges 5b of the bars of a pair are bent outwardly from each other or flared as at 5e to better enable the dislodged cell boards to enter and be guided between said flanges.

An operating arm 14 is fixed to one end of the rock shaft 13 and has journalled on its free end, a roller 15 which is engaged by an edge cam on a cam wheel 16 fixed to one end of the shaft 8a. The edge cam is made up of a series of curved risers 16a connected by straight inwardly extending cam surfaces 16b, whereby in the rotation of the cam wheel, the operating arm will be caused to move upwardly and downwardly, and will impart corresponding movements to the pairs of lifting members to cause them to be presented for action on the molded articles on the trays.

The roller 15 is held in contact with the edge cam, by means of a spring 17 connected to the operating arm 14 and to the framework, as shown in Fig. 5, whereby the arm moved positively upward by the cam risers, will be moved downwardly by the spring as the roller rides along the inwardly extending cam surfaces 16b.

The lifting bars are each mounted on the rock shaft 13 in such a manner that they will be capable of a limited rocking movement on the shaft, to the end that their active ends will better accommodate themselves to the position of the trays, as said ends are presented in cooperative relation to the cell boards thereon. A form of such mounting is shown in Fig. 8, in which it will be seen that there is fixed to the underside of each lifting bar, a bearing block 18 formed with a circular bearing 19 surrounding the shaft 13, a tooth 20 being extended inwardly into the bearing opening and engaging in a short circumferential recess 21 in the shaft, whereby the bearing block and consequently the lifting bar to which it is connected, is permitted a limited rocking movement on the shaft. A torsion spring 22 is fixed to the shaft, and its free end is extended so as to bear against the underside of the lifting bar, and said spring tends to hold the active end of the lifting bar down yieldingly, in which position the tooth 20 will bear against the right hand side of the notch, as viewed in Fig. 8, and thus limit said downward movement of the bar; and when the bar yields and moves upwardly at its active end, said tooth will bear against the left hand end of the notch and thus limit such upward movement. The purpose of this construction is to give the lifting bars a latitude or flexibility of movement independently of that transmitted to the same by the cam wheel, so that in the event of inaccuracies in the movements of the trays or the positioning of the lifting bars thereto, the latter will accommodate themselves to such inaccuracies, and will be enabled to assume their proper operative relations to the cell boards on the trays without danger or injury to the parts.

In the operation of the mechanism, the lifting bars controlled by the cam wheel, are moved down at their active ends to meet the advancing trays as they pass around the sprocket wheels 8, and in order that the trays will be supported and held in a position to enable the active ends of the lifting bars to properly cooperate with the cell boards on the trays in dislodging the same, the following instrumentalities are provided.

As best shown in Figs. 2, 6 and 7, tray positioning discs 23 are fixedly mounted on the shaft 8ª at the inner sides of the sprocket wheels, in the peripheral edges of which discs, curved open recesses 24 are formed, and are so spaced around the discs as to receive the bases of the arms 3ᵇ on the ends of the trays as said trays pass in succession around the sprocket wheels, whereby the trays will each assume a definite circumferential relation to the discs as they pass in succession between the same. The discs are further provided at each side of the respective recesses, with inwardly extending tray supporting lugs 25, in such position that, with the arms of a tray seated in the recesses in the opposing discs, the bottom of the tray will rest on and be supported at its ends by said lugs, as shown in Fig. 6; whereby the tray will be supported in a definite relation to the discs in a position at right angles to the radius of the same, as the tray moves around in its path or circuit.

The motion of the lifting bars by the cam wheel is so coordinated with the position of the trays, as determined by the tray positioning discs as the tray travels around the sprocket wheels, that as the tray approaches the lifting bars, the latter will be moved down to meet it from the position shown in Fig. 5 to that shown in Fig. 6, and as shown in the latter figure the tongues on the ends of the bars will be inserted beneath the forward edges of the cell boards. The roller 15 is now descending on the cam surface 16ᵇ, and as the tray continues to advance, the tongues on the lifting bars will be caused to traverse the upper surface of the tray bottom and will thus dislodge the cell boards therefrom by a stripping action, the roller 15 during this action having traveled up the next cam riser and having caused the lifting fingers to take a position ready to act on the cell boards on the next tray following in the series.

The dislodged cell boards are received between the pairs of lifting bars and are directed by them downwardly and outwardly, and fall on an inclined board or chute 26, by which they are directed onto a table or other support 27.

It will be understood from the foregoing description, that the improved mechanism acts to strip the molded articles from their carrying trays automatically as the trays, after emerging from the drying chamber or oven, continue on in their path of travel; and also it will be understood that the positions of the trays are so controlled in their travel, and that the movements of the lifting bars are so governed, that the active ends of the bars, after engaging beneath the forward edges of the cell boards, will traverse the bottom of the trays and will lift the cell boards therefrom in a gentle and regular action.

The provision of the flexible tongues on the ends of the lifting bars, in cooperation with the movable mounting of the bars on their rock shaft as described, insures the proper positioning of the tongues relative to the trays, and avoids any injury to the parts in the event of any minor inaccuracies in the movements of the trays or bars.

It will be understood that while the invention has been shown and described in connection with carrying trays receiving the cell boards from a transfer mold wheel, which in turn receives the cell boards from a forming mold wheel, the invention is not limited to a mechanism of this special and particular type, but is applicable in all cases where the molded article or cell board is carried by traveling trays, without regard to the particular manner of forming the cell boards or delivering the same to the traveling trays; and while the invention has been described and illustrated as embodied in the particular detailed form and arrangement of parts shown, it will be understood that these details may be variously changed and modified without departing from the spirit of the invention, and further, it will be understood that the invention is not limited to any particular form or construction of the parts, except in so far as such limitations are specified in the claims.

Having thus described my invention, what I claim is:—

1. In combination with a series of traveling trays adapted to support articles, means for dislodging the articles from the trays, said means including a rock shaft, means for rocking the same, and a member carried by the shaft and yieldable relatively thereto, and adapted to be operated by the shaft to engage the articles on the successive trays and dislodge the same.

2. In combination with carrying chains, traveling trays thereon for supporting articles, guide wheels over which said chains pass, means for dislodging the articles from the trays, said means including a member movable to engage beneath the articles on the successive trays, and means for moving said member periodically in coordination with the movements of the trays, and means rotatable with the guide wheels and engaged by the trays for supporting the same independently of the carrying chains.

3. In combination with a chain of traveling trays adapted to support articles, guide wheels over which said chain of trays passes, means for dislodging the articles from the trays, said means including a member movable to engage the articles on the successive trays, discs movable with the guide wheels, and lugs on said discs adapted to be engaged by the trays to support the same.

4. In combination with a chain of traveling trays adapted to support articles, guide wheels over which said chain of trays passes, means for dislodging the articles from the trays, said means including a member movable to engage the articles on the successive trays, discs rotatable with the guide wheels and provided in their peripheries with recesses, and projections on the trays to engage in said recesses to control the position of the trays.

5. In combination with a series of traveling trays formed with flat bottoms on which flat articles are supported, means for imparting a traveling motion to the trays, means coactive with said trays for dislodging and removing the articles therefrom, said latter means including a pair of spaced stiff bars provided on their ends with flexible terminal portions, and disposed outward of the path of travel of the trays and movable inwardly toward the same to engage at their flexible ends between the bottom of a tray and the side edges of an article supported thereon and thereby traverse said bottom as the tray advances and dislodge the article therefrom, the spacing of said bars in relation to the width of the dislodged article being such that said article will be received and supported at its side edges only by said bars, and means coordinated with the travel of the trays for moving the spaced bars inwardly periodically to meet and act on the traveling trays in succession.

6. In combination with a series of traveling trays adapted to support articles and movable angularly at a given point of their travel downwardly in a curved path, means for dislodging the articles from said trays, said means including a member movable from a position outward and free of the trays, to a point to meet the advancing trays so as to act along the bottoms thereof beneath the articles thereon, and mechanism coordinated with the travel of the trays to move the said member inwardly to cooperate with the trays in succession, said mechanism including means acting to positively move the member outwardly angularly to correspond with the angular travel of the trays while said member is engaged with the article in dislodging the same.

7. In combination with a series of traveling trays, each provided with edge flanges between which articles are received, the front and rear flanges being provided with alined notches to permit access between the bottom of the tray and underside of the article supported thereon, means for dislodging the articles from the trays, including spaced members movable through said notches to engage beneath the article and dislodge the same, and means coordinated with the travel of the trays for moving said members periodically to enter the tray by the front notches and to leave the same by the rear notches.

8. In combination with carrying chains, guide wheels over which said chains pass, trays carried by said chains and adapted to support articles on the bottoms thereof, means for driving the chains, a rock shaft extending parallel with the axes of said wheels at the outer sides of the chains at a point adjacent the same, a pair of article lifting bars mounted on said shaft outward of said trays and movable to and from the trays to engage between the bottoms of the trays and the undersides of the articles thereon to dislodge the latter, an operating arm on the shaft, and means controlled by the rotation of the guide wheels for actuating said arm periodically in accordance with the movement of the trays to cause the article lifting bars to cooperate with said trays in succession in dislodging and discharging the articles.

In testimony whereof, this specification has been duly signed by:

RALPH A. FARNHAM.